United States Patent [19]

Hamnett et al.

[11] Patent Number: 5,527,434

[45] Date of Patent: Jun. 18, 1996

[54] PROCESS FOR THE PREPARATION OF CONDUCTIVE POLYMERS

[75] Inventors: Andrew Hamnett; Paul A. Christensen, both of Morpeth; Daniel C. Read, Sidcup, all of Great Britain

[73] Assignee: The University of Newcastle Upon Tyne, Great Britain

[21] Appl. No.: 256,583

[22] PCT Filed: Jan. 15, 1993

[86] PCT No.: PCT/GB93/00094

§ 371 Date: Jul. 18, 1994

§ 102(e) Date: Jul. 18, 1994

[87] PCT Pub. No.: WO93/14504

PCT Pub. Date: Jul. 22, 1993

[30] Foreign Application Priority Data

Jan. 18, 1992 [GB] United Kingdom .................. 9201082
Aug. 17, 1992 [GB] United Kingdom .................. 9217469

[51] Int. Cl.⁶ .............................. C25B 3/00; C25B 3/02
[52] U.S. Cl. .................. 205/337; 526/256; 526/258; 528/380; 528/423; 205/419
[58] Field of Search .......................... 252/500; 526/256, 526/258; 204/59 R, 72, 78; 528/380, 423

[56] References Cited

U.S. PATENT DOCUMENTS 5,120,807 6/1992 Wei et al. ........................... 526/204

OTHER PUBLICATIONS

Polymer Communications '88 vol. 29 Jan. pp. 21–24.
Polymer '87 vol. 28 Apr. pp. 651–658.
Polymer '88 vol. 29 Aug. pp. 1522–1527.

Otero et al: "Thiophene Electropolymerization by Cyclic Voltammetry: Temperature Influence", Polymer Communications, vol. 29, Jan. 1988, pp. 21–24.

Otero et al: "Formation and Modification of Polypyrrole Films on Platinum Electrodes by Cyclic Voltammetry and Anodic Polyermication", Polymer, vol. 28, Apr. 1987, pp. 651–658.

Otero et al: "Electrochemical Generation of Polythiophene Films on Platinum Electrodes", Polymer, vol. 29, Aug. 1988, pp. 1522–1527.

Primary Examiner—John Niebling
Assistant Examiner—Edna Wong
Attorney, Agent, or Firm—Cushman Darby & Cushman

[57] ABSTRACT

Provided is a method for preparing a conductive polymer which is highly transparent to visible light in at least one of its conductive and non-conductive states. A solution containing a monomer component and an electrolyte is introduced into an electrochemical cell and subjected to polymerization by cyclic voltammetry. The solution is maintained at a temperature within a range of from 0° to −40° C. inclusive. Prior to the polymerization, cyclic voltammetry is firstly performed at a potential below that at which anodic or cathodic polymerization may take place, anodic and cathodic limits (A) and (B) being held at respective values. A trace of current/voltage is monitored until the trace becomes stable, and thereafter the value of the limit (B) is progressively increased until the said value reaches a critical potential having a magnitude at which anodic or cathodic polymerization is initiated.

16 Claims, 10 Drawing Sheets

PROCESS FOR THE PREPARATION OF CONDUCTIVE POLYMERS

The present invention is concerned with the preparation of polymers which are electronically conductive, and with polymers obtained by that process.

It is known that certain organic polymeric materials may be conductive and further that certain such polymers may be reversibly and repeatedly converted between conductive and non-conductive states by the application of a potential difference across a film of the polymer. In general, available conducting polymers are coloured materials, typically weakly coloured in the non-conducting state and strongly coloured in the conducting state or vice versa.

It is known to prepare conducting polymers by electrochemical polymerization. The polymerization of pyrrole by such a process is described in the Encyclopedia of Polymer Science and Engineering, Vol 13, Wiley—Interscience, New York, 1988, pages 42–55. In such a process, the monomer is dissolved in an appropriate solvent in the presence of an electrolyte in an electrolyte cell. Electrochemical polymerization is carried out at room temperature and at a constant fixed voltage to precipitate the polymer onto an anode. However, under such conditions, coloured films tend to be produced.

In order to improve the strength, especially the elongation at break of such films, it is known to prepare a film by electrochemical polymerization of pyrrole carried out at low temperatures between 0° and –40° C. Such films are mechanically stretchable to provide a highly oriented film with improved conductivity; see Ogarawara et al, Mol. Cryst. Liq. Cryst. (1985), 118, 159–162.

Conducting polymers are potentially suitable for use in the form of a film applied to the windows of a building to control the flow of infra-red radiation, especially heat energy, through the windows; see U.S. Pat. No. 5,099,621.

If the film is able to prevent such flow in one of its states (for example in its conducting state) but to allow the transmission of heat energy in its other state, then loss of heat through the windows can be reduced or prevented when required, by the application of the necessary potential difference across the film. However the strongly coloured available polymers are aesthetically unsuitable for such a purpose.

There is also a potential use for conductive films in the field of infra-red photography, to generate images on substrates which are sensitive to infra-red radiation but insensitive to visual light. However films for this purpose clearly must be transparent.

There is therefore a need for a conducting polymeric material which is transparent to light in the visible range in both its conducting and non-conducting states, even if a colour change occurs in the change between those states. More preferably, the material should be colourless in both states.

Attempts have been made to produce improved conducting polymers suitable for the foregoing purposes, by synthesising novel monomeric materials from which to prepare the polymers. However the manufacture of the new monomers is both complicated and expensive and the polymers arising are relatively unstable and still exhibit colour in their conducting form.

The present invention seeks to minimise or avoid the above difficulties by providing conducting polymers having improved properties and provides a modified method of production by which this can be achieved.

Thus, the present invention provides a method of preparing a conductive polymer by electrochemically polymerizing a monomer component comprising at least one monomer in an electrochemical cell having at least an anode and a cathode, which method comprises introducing into the cell a solution containing the monomer component and an electrolyte, maintaining the solution at a temperature within a range of from 0° to –40° C. inclusive, and repeatedly cycling an electrode potential applied to the cell between cathodic and anodic limits one of which (A) is fixed and the other of which (B) is set at a value at which anodic or cathodic polymerization takes place, thereby to effect the electrochemical polymerization, which method comprises the additional steps, prior to the polymerization, of i) repeatedly cycling an electrode potential applied to the cell between cathodic and anodic limits one of which (A) is fixed and the other of which (B) is set at a value having a magnitude below that at which anodic or cathodic polymerization may take place, ii) holding each of the limits (A) and (B) at their respective fixed and set values and simultaneously monitoring a trace of current/voltage (hereinafter referred to as a cyclic voltammogram or CV) until the trace becomes stable, and thereafter iii) progressively increasing the value of the limit (B) until the said value reaches a critical potential having a minimum magnitude at which anodic or cathodic polymerization is initiated.

The polymerization may then be carried out by repeatedly cycling to this minimum critical potential, or to a potential having a magnitude no more than 0.01 V greater.

Moreover, it is often found that after initiation of polymerization it is necessary gradually to increase the limit to which the potential is cycled in order to maintain polymerization as the polymer film builds up to the desired thickness.

By cycling the electrode potential in this manner before initiation of polymerization and gradually increasing the value of potential (B) which is to induce polymerization up to a value at which polymerization is to be carried out it is possible simultaneously to achieve (a) stable electrolytic conditions under which polymerization is carried out, and (b) selection of a potential (B) which is the minimum required efficiently to effect polymerization thereby allowing growth of the polymer film to occur as slowly and therefore in as controlled a manner as possible.

Furthermore, by continuing to cycle the electrode potential during polymerization a slow, controlled, stable polymer growth can be maintained until the desired film thickness is achieved.

Under such specified, carefully controlled conditions we found that it is possible to provide films which are highly transparent in the visible region. The films may be capable of switching between conducting and non-conducting states and may be highly transparent in the visible region in at least one of these states, preferably the conducting state and more preferably in both their conducting and non-conducting states. They may also be opaque in the infra-red region, especially when in their conductive state thus rendering them particularly useful as coatings for windows capable of retaining heat within a building. Moreover, the films may have particularly stable conductive properties.

For cathodic polymerization reference to an increase in the magnitude of the cathodic potential means an increase in negative charge.

However, preferably, the polymerization is anodic polymerization and the electrode potential (B) is an anodic potential capable of providing oxidation of the monomer component at the anode.

In such a method, the electrode potential is cycled repeatedly between a fixed cathodic limit and an anodic limit which initially is held at a fixed value until the current/voltage trace (the cyclic voltammogram) stabilises and then is progressively increased to a value at which polymer formation takes place.

As indicated, one of the important variables which is to be carefully selected and controlled is the temperature of the reaction mixture which is maintained at a value within the range of 0° C. to minus 40° C. and is more preferably maintained at a value below about minus 10° C., especially at about minus 15° C.

A second important feature of the process according to the present invention is the cycling of the electrode potential between limits as specified above. That is, the electrode potential is initially cycled between a fixed cathodic limit and a fixed anodic limit until the cyclic voltammogram stabilises, whereupon a desired preconditioning of the system is judged to have been completed, and is then further cycled between the fixed cathodic limit and an anodic limit which is progressively increased, preferably in small steps, until it just exceeds the critical potential above which polymer formation occurs. That critical potential will differ among different systems but can be identified by the occurrence of a gradual and continuous increase in the level of the anodic current with each cycle.

It is found to be preferable to fix the cathodic potential within the range −0.3 to −0.7 V inclusive, more preferably at around −0.5 V.

It is preferred to carry out the polymerization by cycling from the negative cathodic potential to a maximum anodic potential which is the minimum or no more than 0.01 V greater than the minimum possible to achieve effective polymerization so as to allow slow and controlled growth of the polymer film. However, it is often found that in order to maintain growth of the polymer film it is necessary, as the thickness of the film builds up, to increase the potential limit to a value which may be up to 0.1 V higher than that at which polymerization was previously initiated. The working potential should then be progressively increased in steps, for example, of the order of 0.01 V until the polymerization continues.

For example, for polythiophene the critical potential may be reached at around 1.65 to 1.75 V (versus a Standard Calomel Electrode). However, in order to maintain the polymerization process it may be necessary to cycle the potential up to a voltage as high as 1.85 V. Usually initiation of polymer takes place at around +1.75 V.

For polybithiophene, the critical potential may be reached at around 1 to 1.2 V. In order to maintain polymerization it may be necessary to cycle up to a voltage of 1.3 V, but initiation is usually achieved at around +1.2 V.

For polypyrrole, the critical potential may be reached at around 0.6–0.7 V. In order to maintain polymerization it may be necessary to cycle up to a voltage as high as 0.8 V, but initiation is usually achieved at around +0.7 V.

Typically, the small steps by which the upper anodic limit is progressively increased towards the critical potential and then above the critical potential in order to maintain polymerization may be of the order of 0.01 V.

A process in accordance with the invention is applicable to the production of a range of polymers which are known to have conducting properties and no doubt to others. For example, it may be used to produce transparent conducting forms of polypyrrole, polythiophene, polybithiophene, polyphenylene, polyaniline and poly(benzo [C]-thiophene).

Typically, the polymeric products may be of such a degree of polymerization as to have from about 40 to about 120 monomer units in each polymer chain, for example of the order of 40 such units per chain.

The solution containing the monomer component and the electrolyte may be obtained by dissolving the monomer and electrolyte in a solvent and the polymerization reaction may be carried out in a range of possible aprotic polar solvents. The solvent should be so selected that it will dissolve the monomer and the electrolyte and be stable throughout the range of operating potentials to be used.

Moreover, the solvent should have a viscosity at the chosen polymerization temperature suitable for electrochemical polymerization. A preferred viscosity lies within the range 0.25 to 6 centipoise (2.5 to 60 Pa.s×10$^{-4}$) inclusive, more preferably less than 3 centipoise (30×10$^{-4}$ Pa.s), especially within the range 0.4 to 1.2 centipoise (4 to 12 Pa.s) inclusive. Suitable solvents include acetonitrile, methanol, propylene carbonate and tetrahydrofuran.

The electrolyte may be any electrolyte capable of presence in a solution at the low temperature employed but is preferably capable of providing a tetrafluorborate or hexafluorophosphate ion. Typical examples are tetra-n-butylammonium tetrafluoroborate or tetra-n-butylammonium hexafluorophosphate.

Apart from the conditions already expressed above, the reaction conditions are those which are usual and well-known for polymerizations of this type. Thus the polymers may be grown upon any suitable inert working electrode, for example a platinum electrode or an indium tin oxide-coated glass electrode. The working electrode should be well-polished before it is used. Similarly, any inert counter-electrode may be used. If it is desired also to use a reference electrode, to provide a base against which to monitor the potential at the working electrode, an aqueous reference electrode is suitable, provided that it is held at a temperature above its freezing point and used over a salt bridge.

The invention will now be further described and illustrated with reference to the accompanying drawings and by means of the following Examples, which briefly describe the application of the process to the production of various transparent conducting polymers.

EXAMPLE 1

Figure 2:
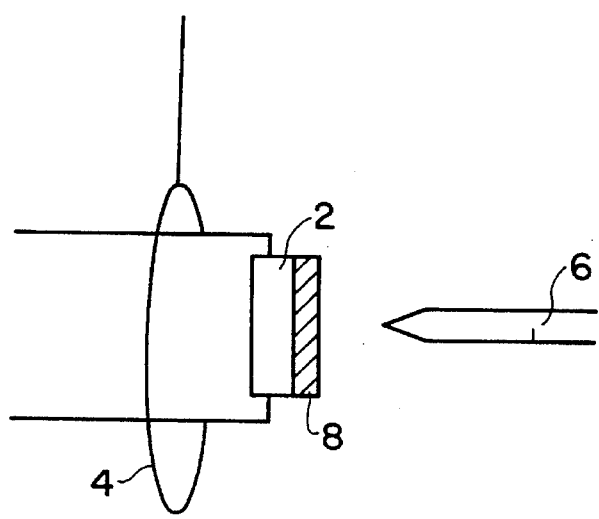
FIG. 2 is a schematic representation of an electrolytic cell used in the preparative process of Example 1 below.

Polythiophene was grown in a standard, three-electrode thermostatted electrochemical cell (as illustrated schematically in FIG. 2) on a polished platinum electrode 2 containing 0.1 moles $dm^{-3}$ of thiophene and 0.1 moles $dm^{-3}$ of tetra-n-butylammonium tetrafluoborate in de-oxygenated acetonitrile. The acetonitrile was freshly distilled under dry nitrogen over calcium hydride as desiccant. The transfer of all reagents to the electrochemical cell was carried out under moisture and air-free conditions. The counter electrode 4 was platinum gauze and the reference electrode 6 was a standard calomel electrode.

Figure 5:
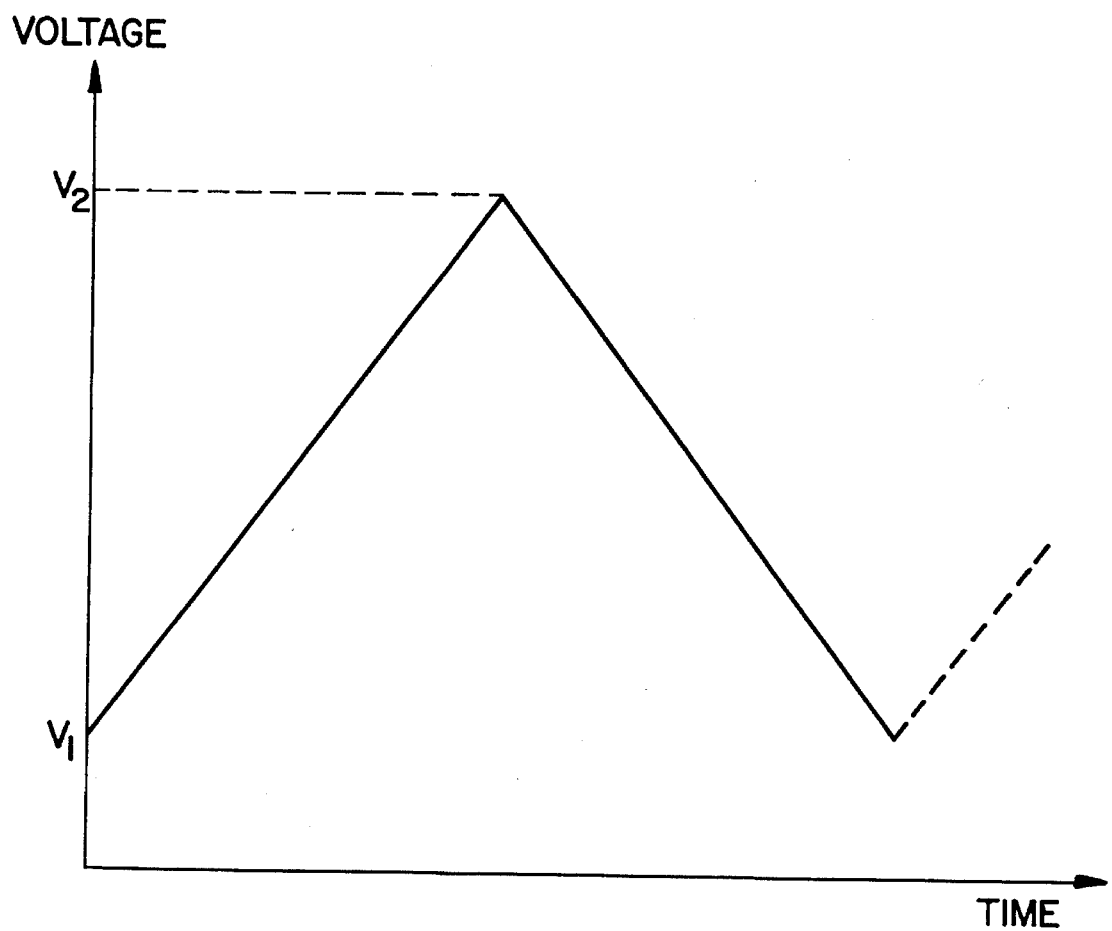
FIG. 5 is a schematic representation of voltage recycling (cyclic voltammetry) employed in a process embodying the invention.

When the cell temperature had been stabilised at about −15° C., the potential of the working electrode was cycled repeatedly between −0.5 V and 1.0 V for thirty minutes (as illustrated in FIG. 5) at a scan rate of (i.e. continuously changing at) 100 mV/sec; the positive limit was then increased in steps of 0.1 V, cycling of the potential being continued until the cyclic voltammogram was stable. When the anodic potential limit reached 1.5 V, cycling was continued for over 60 minutes until the currents observed during the potential cycles had dropped to almost zero.

Figure 6:
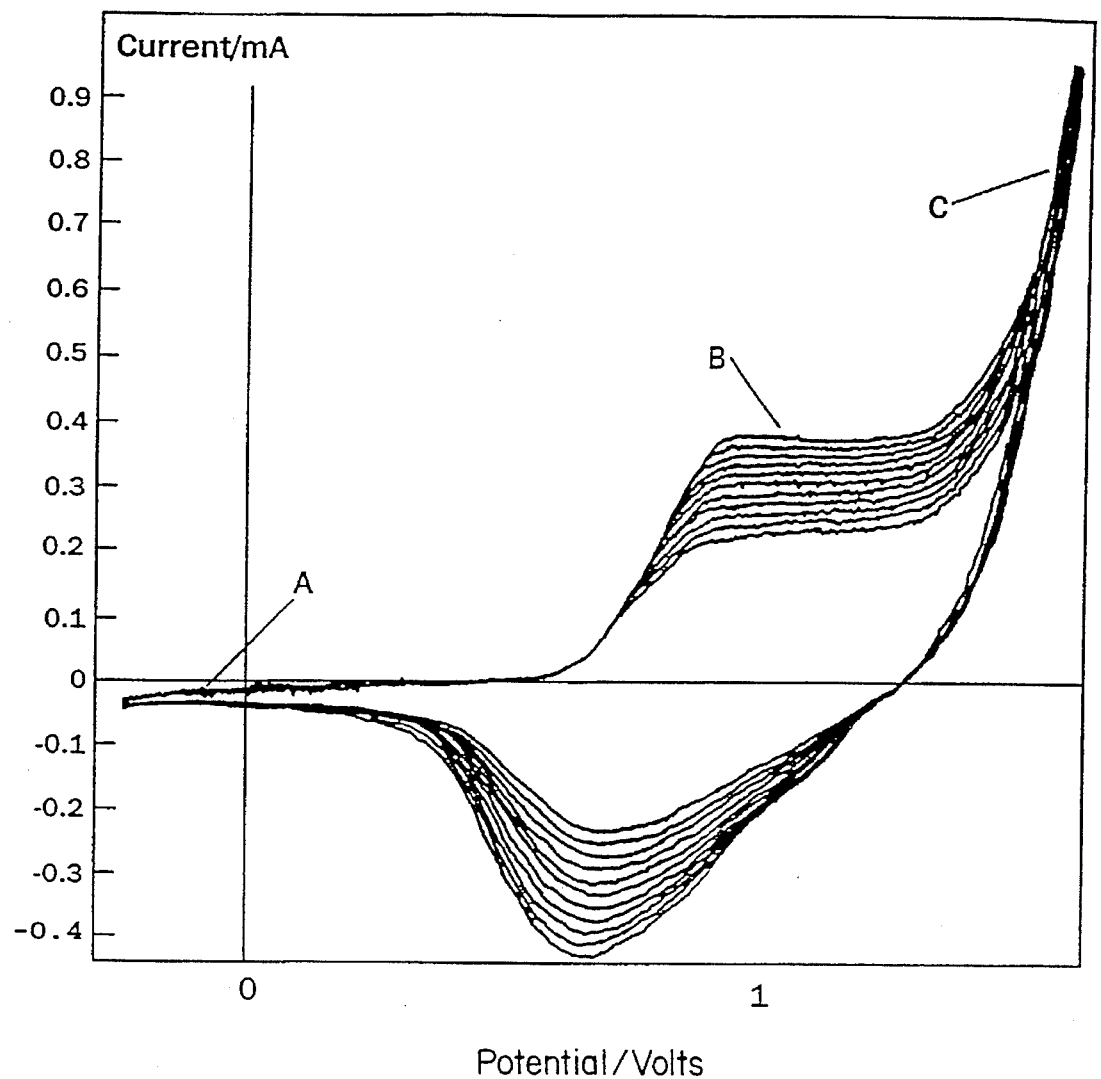
FIG. 6 is an actual voltammogram response for the growth of polythiophene in acetonitrile with tetrabutylammonium tetrafluoroborate as background electrolyte as in Example 1 below.

The positive limit was then again increased, in 0.01 V steps, the cyclic voltammogram again being allowed to stabilise each time before the next increase in the limit. The increasing of the limit and the cycling of the potential were continued until polymer growth was initiated, as shown by a gradual and continuous rise in the anodic current with each cycle. This occurred, in the exemplified case of polythiophene, at about +1.75 V versus SCE. Film growth was continued until a polymer film 8 of the desired thickness was obtained. The cyclic voltammogram response during this growth is shown in FIG. 6. As can be seen, this includes respective regions A where the polymer is in neutral insulating form, B where the polymer is in oxidised conducting form and C where polymer growth takes place in a slow and controlled manner.

The resulting polythiophene film was highly transparent in both its conducting and its non-conducting forms.

EXAMPLE 2

Figure 3:
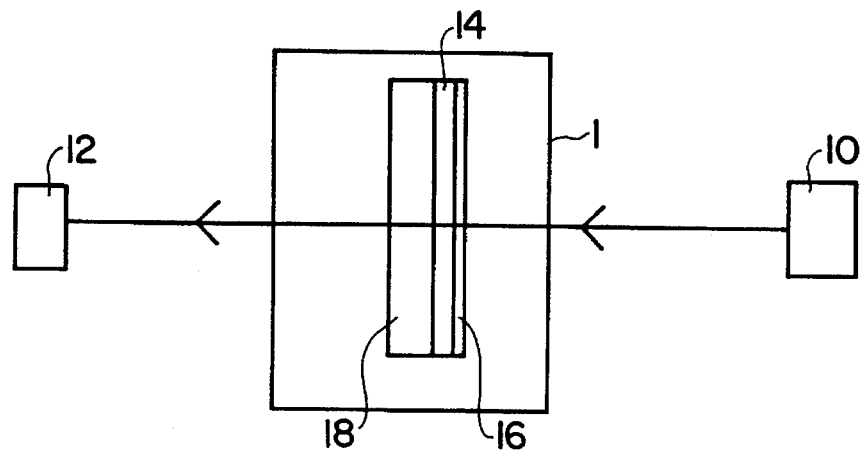
FIG. 3 is a schematic representation of an electrolytic cell allowing in-situ spectral assessment in the UV-visible light range.

In order to demonstrate more clearly the improvement in transparency achieved at low temperature as compared with that at room temperature, the above experiment was repeated both at −15° C. and at room temperature in a cell, shown schematically in FIG. 3 from which the reference and counter electrodes have been omitted for clarity.

The cell 1 is specifically designed to allow in-situ UV-visible studies and is disposed between a light source 10 and a detector 12. The anode 14 on which polymer film 16 is grown consists of a conducting metal layer of indium tin oxide (ITO) on a glass slide 18. UV-visible spectra films in the oxidised form were collected at 10 minute intervals, and referenced to a blank of solvent, electrolyte and monomer.

Figure 7:
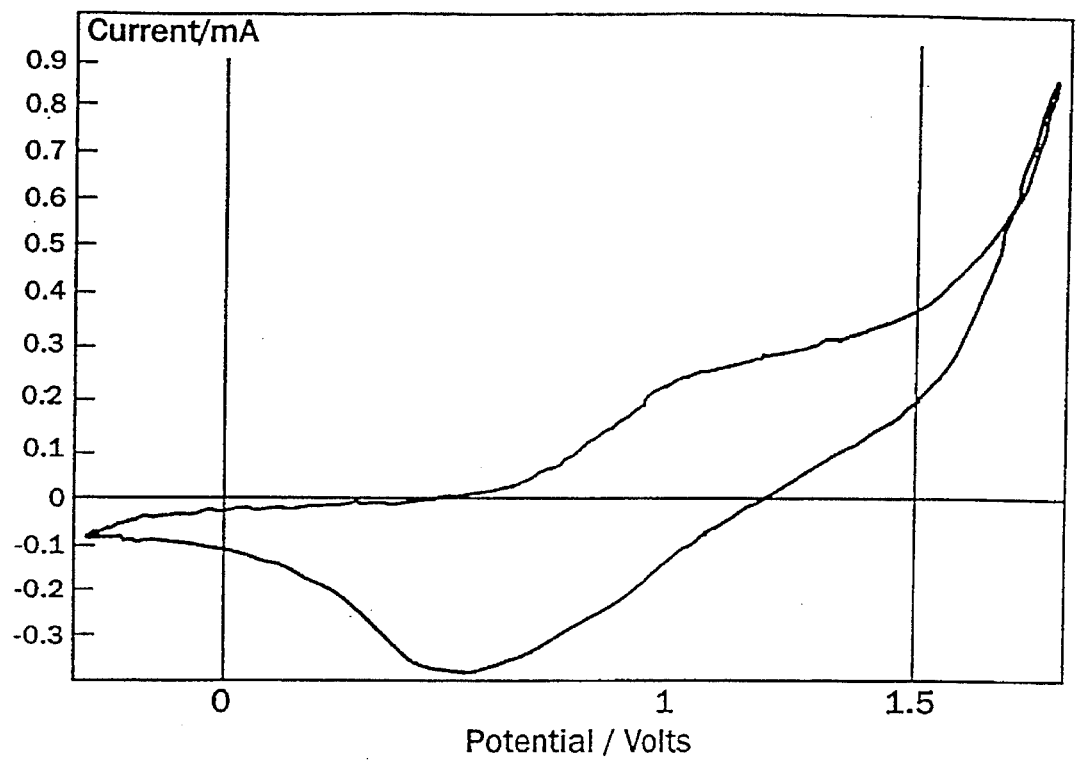
FIGS. 7 and 8 show growth cyclic voltammograms (CVs) for polythiophene films grown at low (−15° C.) temperature (FIG. 7) and room temperature (FIG. 8)
Figure 8:
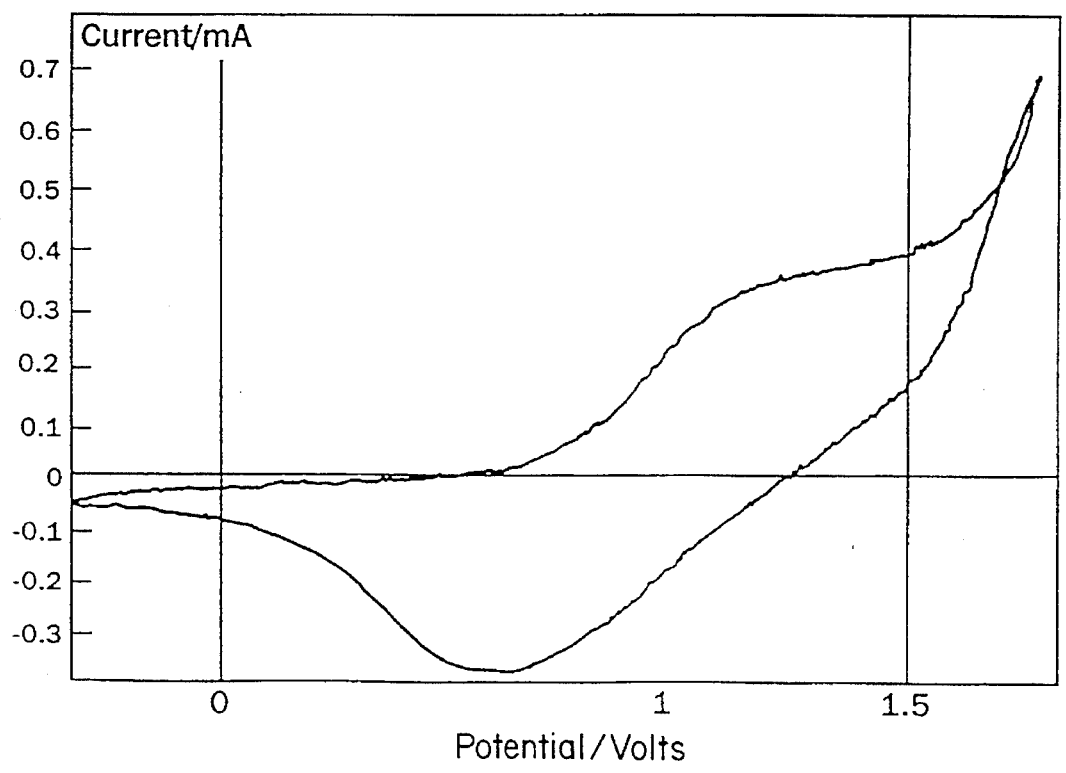

During the growth of the respective films, growth cyclic voltammogram plots were taken and the results are shown in FIGS. 7 (low temperature polymerization) and 8 (room temperature polymerization). Integration to determine the area under these respective curves during the oxidative stage (between 0.5 and 1.5 volts) gives the charge passed (2.04 mC for FIG. 7 and 2.14 mC for FIG. 8) which is directly related to film thickness and shows that the respective films were grown to the same thickness. Thus, a comparison of respective UV-visible spectra fairly reflects differences in transparency.

Figure 9:
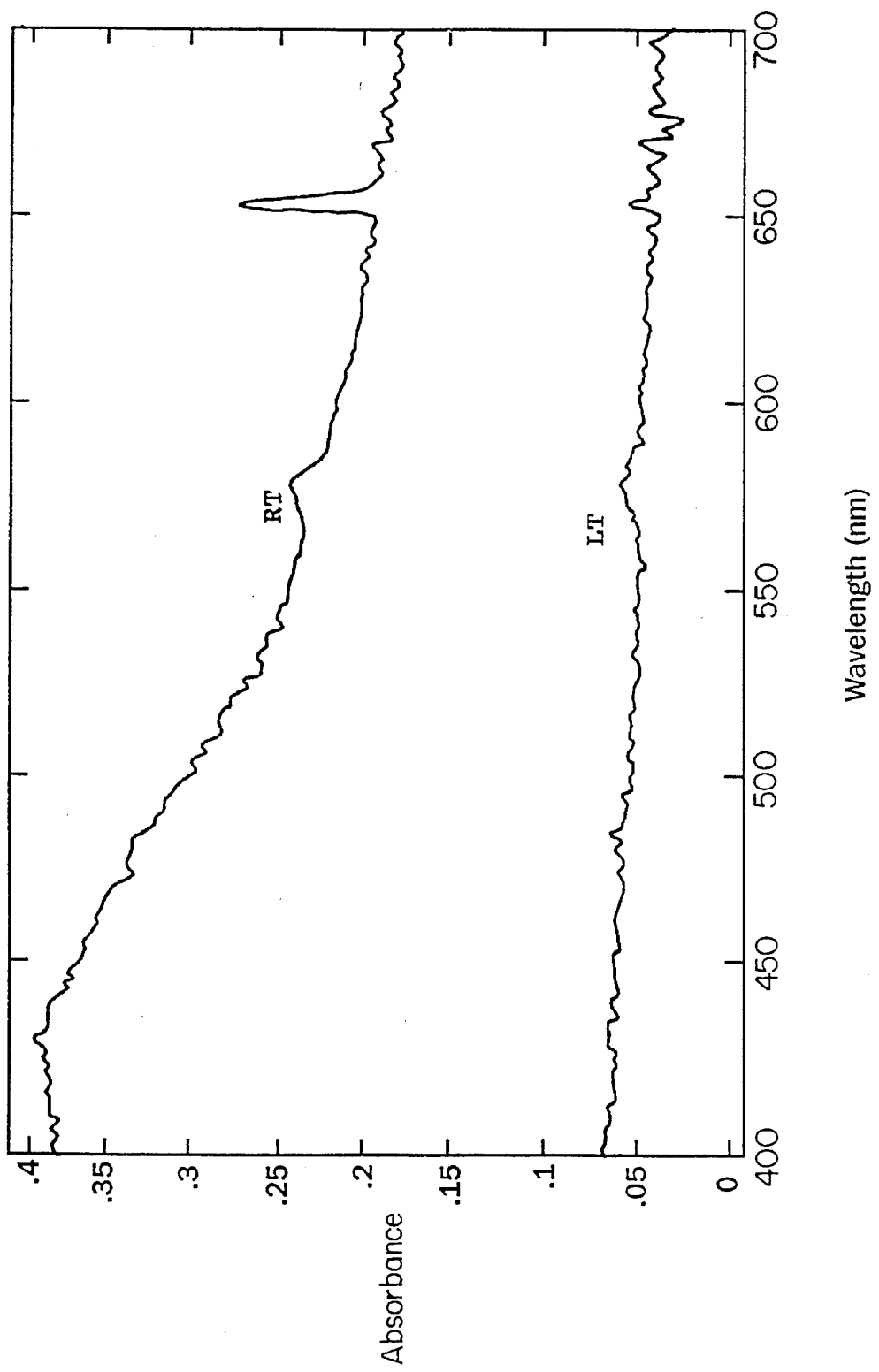
FIG. 9 shows a comparison of UV-Vis spectra obtained during the growth of polythiophene films grown at room temperature (RT) and at low (−15° C.) temperature (LT)

FIG. 9 shows the in-situ UV-visible spectra, obtained during film growth, for films prepared by both room temperature (RT) and low temperature (LT) polymerization and the much lower absorbance achieved at low temperature is clearly apparent. This difference was maintained at RT.

EXAMPLE 3

Figure 4:
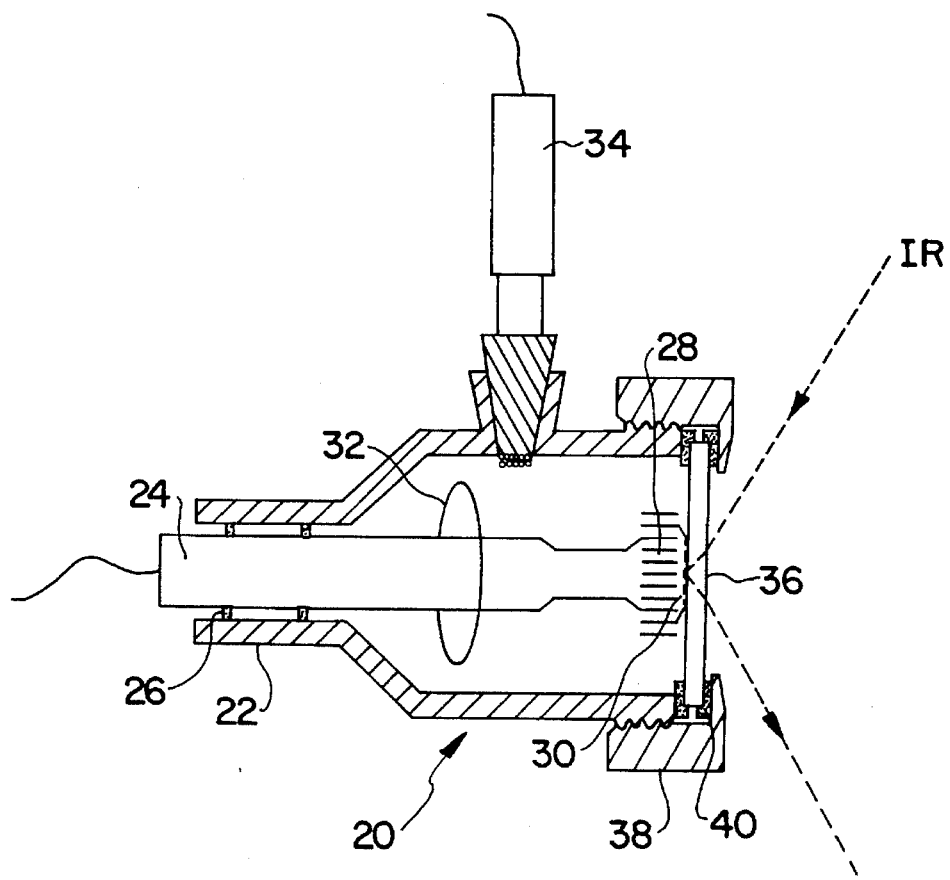
FIG. 4 is a schematic representation of an electrolytic cell allowing in-situ spectral assessment by a Fourier Transformation-IR (FTIR) spectrometer.

It is of advantage to be able to provide a film which, while being transparent to visible light is opaque to infrared (IR) radiation, especially in the mid-IR range. In order to demonstrate such properties, polybithiophene was grown from bithiophene monomer both at room and low (−15° C.) temperatures in a cell specifically designed to allow in-situ Fourier Transformation-IR (FTIR) studies and shown in FIG. 4 using a Biorad FTS 40 FTIR spectrometer.

The cell comprises a glass chamber generally indicated as 20 of cylindrical shape and having an axial end region of reduced diameter and defining a sleeve 22 in which is slidably mounted an electrode holder 24 of polytetrafluoroethylene (PTFE) coaxial with the chamber 20. O-ring seals 26 are disposed between the sleeve 22 and electrode holder 24. The electrode holder 24 has, at an axial end remote from the sleeve 22, a disc 28 providing an axial end face of the electrode holder on which is disposed a platinum working electrode 30. A circular platinum wire counter electrode 32 surrounds the electrode holder 24 and a calomel reference electrode 34 is plugged into the cylindrical wall of the chamber 20. An axial end of the chamber 20 remote from the sleeve 22 is closed by a $CaF_2$ window 36 held in position by a screw cap 38 of plastics (PVDF) material cooperable with a PTFE seal 40.

For FTIR measurement the position of the electrode holder 24 is adjusted so that the platinum working electrode 30 lies adjacent the window 36 and an IR beam is directed at the polymer film growing on electrode 30, the reflected beam being detected by a liquid $N_2$ cooled Hg-Cd-Te detector.

The conditions for growth of the polybithiophene films were the same as those of Example 1, except that the anodic potential was stabilized at 0.9 V and then progressively increased in 0.01 V stages to a potential of 1.2 V at which growth took place.

Figure 10:
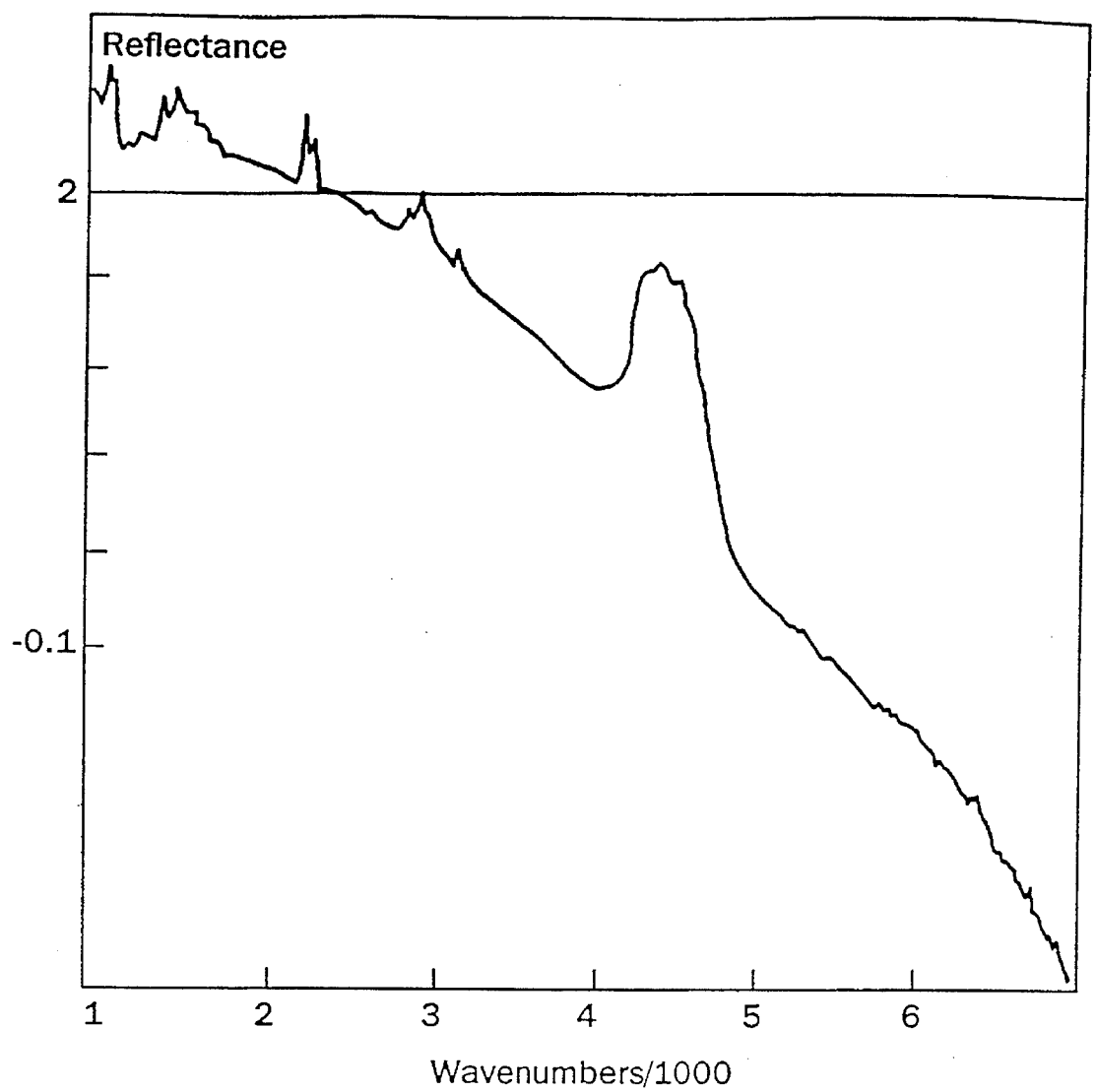
FIGS. 10 and 11 are Fourier Transformation Infra Red (FTIR) spectra, taken at room temperature, of polybithiophene films in fully oxidised form relative to respective films in neutral form and grown at room temperature (FIG. 10) and low (−15° C.) temperature (FIG. 11) respectively.
Figure 11:
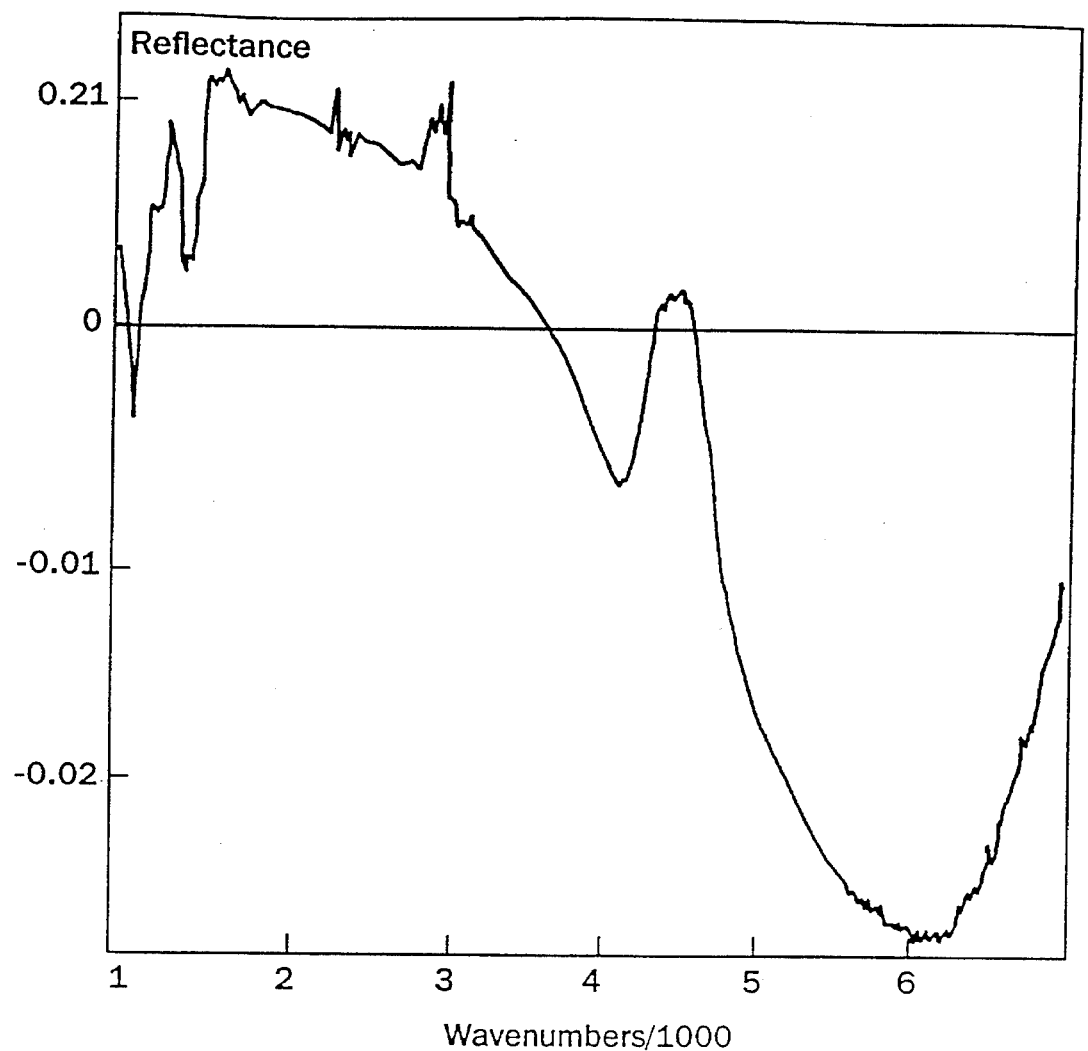

FTIR reflectance plots were obtained, at room temperature, for polymer films grown at room and low temperature respectively, in fully oxidised form at 1.0 V relative to film in neutral form at 0.0 V. CV Experiments (results not shown) corresponding to those of Example 2 showed that the respective films were of similar thickness. The results of FTIR are shown in FIG. 10 (room temperature polymerization) and FIG. 11 (low temperature polymerization). As can be seen, for a film prepared by room temperature polymerization the electronic absorption (negative reflectance) does not reach a maximum within the IR range, whereas for a film prepared by low temperature polymerization the electronic absorption reaches a maximum at a wavenumber of 6200 cm$^{-1}$ towards the centre of the IR region.

Moreover, visible inspection of the film grown at low temperature showed this to be highly transparent in both its conducting and non-conducting forms, whereas, in its conducting form, the film prepared at room temperature was highly coloured.

This demonstrates clearly that the film obtained by low temperature polymerization obtained by a method embodying the invention is highly transparent to visible light but opaque to IR radiation and will thus provide a useful film for preventing escape or entry of heat through a window on which it is provided.

EXAMPLE 4

Figure 1:
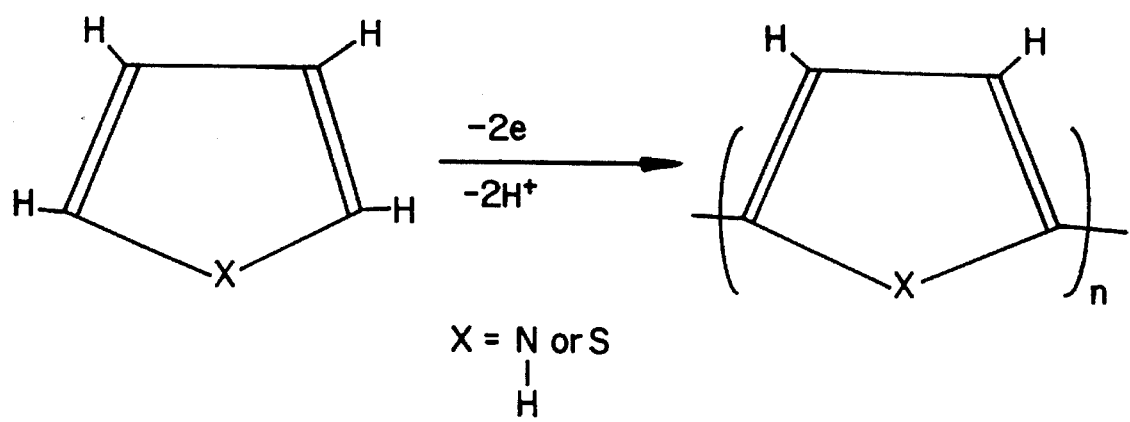
FIG. 1 represents the reaction taking place during the electrochemical polymerization of thiophene (X= S) or pyrrole (X= NH)

The method of Example 3 was repeated for the polymerization of pyrrole (see FIG. 1, X= NH) both at room temperature and low temperature (−15° C.)

The conditions for growth of the polypyrrole films were the same as that of Example 4, except that the anodic potential was stabilized at 0.4 V and then progressively increased in 0.01 V stages to a potential of 0.7 V at which growth took place.

Visible inspection of the film grown at low temperature showed this to be highly transparent in both its conducting and non-conducting forms, whereas, in its conducting form the film prepared at room temperature was highly coloured.

Figure 12:
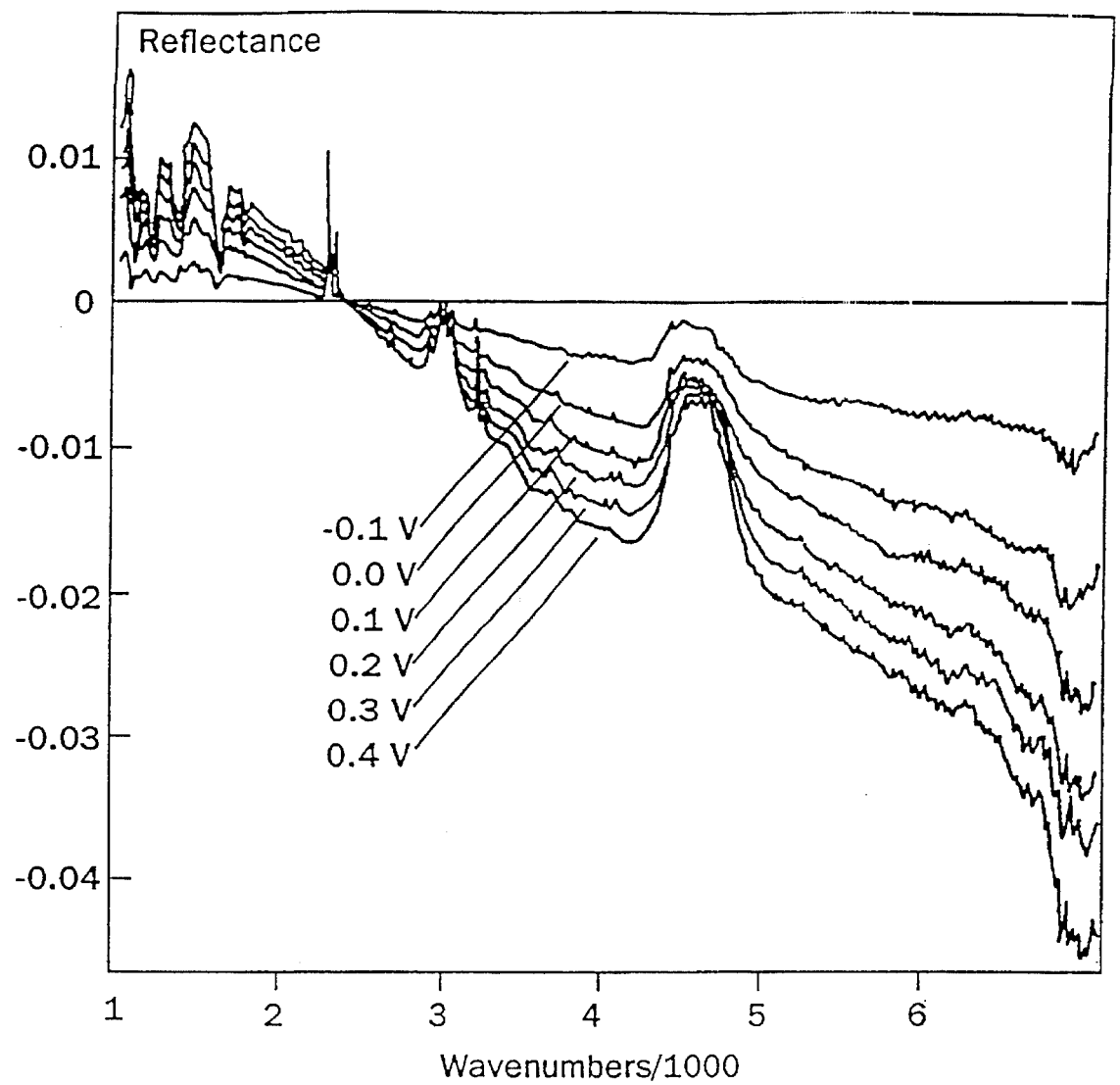
FIGS. 12 and 13 are FTIR spectra, taken at room temperature, of polypyrrole films in fully oxidised form relative to respective films in neutral form and grown at room (FIG. 12) and low (FIG. 13) temperatures respectively.
Figure 13:
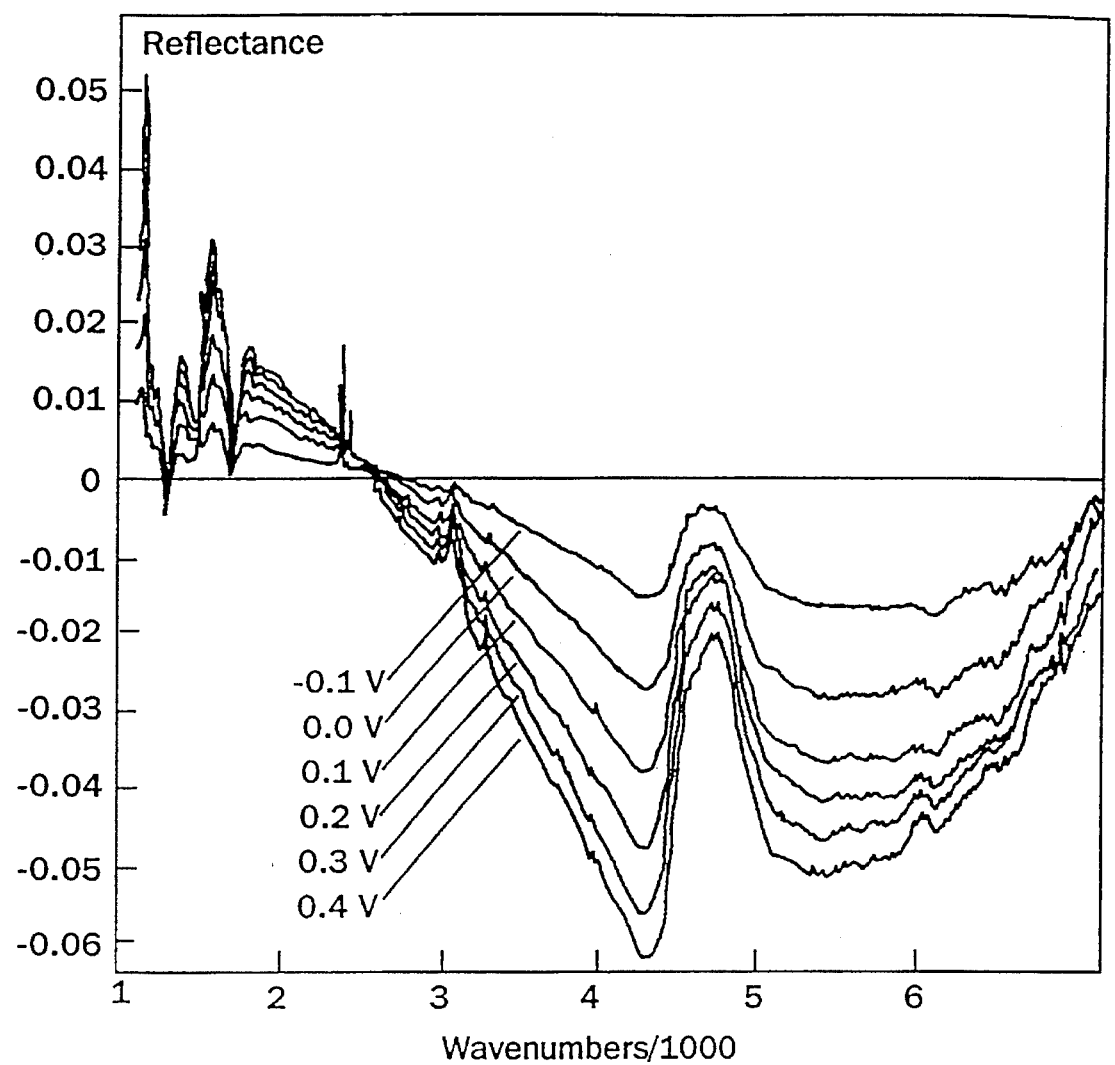

The result of FTIR plots obtained at room temperature for films of similar thickness (as determined by CV experiments) grown at room temperature and low temperature are shown in FIGS. 12 and 13 respectively.

Again these results demonstrate how, for both films, electronic absorption increases on oxidation up to 0.7 V, relative to the neutral form at −0.2 V, but that for the film grown at room temperature a maximum absorption is not reached within the IR range, whereas the film grown at low temperature has a minimum absorption towards the mid IR region.

It can be seen clearly from the Examples that processes embodying the invention can be used to prepare a polymer film which in its rest (i.e. neutral or non-electronically conducting) state is insulating and transparent to both visible and infra red. On the other hand, if a voltage is applied across the film it will conduct electricity and become opaque to infra red, while remaining highly transparent to visible light.

The preparation process may be carried out easily and efficiently and the starting monomer components may be a cheap and widely available monomer such as pyrrole or thiophene.

Thus, the technologically extremely important goal of successfully synthesising highly transparent electronically conducting polymers has been achieved by processes embodying the invention. Such materials are useful as antistatic coatings, transparent electromagnetic shielding and especially "smart" windows which include a film capable of assuming conductive and non-conductive states and a device capable of switching the film from one state in which the film is opaque to IR to another in which the film is transparent to IR. By selection of a particular monomer component, the physical characteristics of the polymer film can be tailored according to requirements.

We claim:

1. A method of preparing a conductive polymer that is transparent in the visible range by electrochemically polymerizing a monomer component comprising at least one monomer in an electrochemical cell having at least an anode and a cathode, which method comprises introducing into the cell a solution containing the monomer component and an electrolyte, maintaining the solution at a temperature within a range of from 0° to −40° C. inclusive, and repeatedly cycling an electrode potential applied to the cell between cathodic and anodic limits one of which (A) is fixed and the other of which (B) is set at a value at which anodic or cathodic polymerization takes place, thereby to effect the electrochemical polymerization, which method comprises the additional steps, prior to the polymerization, of i) repeatedly cycling an electrode potential applied to the cell between cathodic and anodic limits one of which (A) is fixed and the other of which (B) is set at a value having a magnitude below that at which anodic or cathodic polymerization may take place, ii) holding each of the limits (A) and (B) at their respective fixed and set values and simultaneously monitoring a trace of current versus voltage until the trace becomes stable, and thereafter iii) progressively increasing the value of the limit (B) until the said value reaches a critical potential having a minimum magnitude at which anodic or cathodic polymerization is initiated.

2. A method according to claim 1, wherein the solution has a viscosity in the range of from 0.25 to 6 centipoise inclusive.

3. A method according to claim 2, wherein the viscosity of the solution is less than 3 centipoise inclusive.

4. A method according to claim 3, wherein the viscosity of the solution is in the range of from 0.4 to 1.2 centipoise inclusive.

5. A method according to claim 1, wherein during the electrochemical polymerization, in order to maintain the polymerization the magnitude of the anodic or cathodic limit (B) is increased to a value no greater than 0.1 V above the minimum critical potential at which the polymerization is initiated.

6. A method according to claim 1, wherein the polymerization is cationic polymerization and the said other electrode potential (B) is an anodic potential capable of providing oxidation of the monomer component at the anode.

7. A method according to claim 6, wherein the monomer component is selected from at least one of pyrrole, thiophene, bithiophene, benzene, aniline and benz[c]thiophene.

8. A method according to claim 7, wherein the monomer component is thiophene and the critical electrode potential is about 1.75 V.

9. A method according to claim 7, wherein the monomer component is bithiophene and the critical electrode potential is about 1.2 V.

10. A method according to claim 7, wherein the monomer component is pyrrole and the critical electrode potential is about 0.7 V.

11. A method according to claim 1, wherein the solution comprises the monomer component, a solvent for the monomer component and an electrolyte.

12. A method according to claim 11, wherein the solvent is selected from acetonitrile, methanol, propylene carbonate and tetrahydrofuran.

13. A method according to claim 1, wherein the solution is maintained at a temperature within a range of from −10° to −15° C.

14. A method according to claim 6, wherein the electrolyte provides a tetrafluoroborate or hexafluorophosphate anion.

15. A method according to claim 1, wherein, in step (iii), the electrode potential (B) is progressively increased towards the said minimum critical potential in steps of the order of 0.01 V.

16. A method according to claim 1, wherein the cell contains an anode, a cathode and a reference electrode.

* * * * *